(12) United States Patent
Ciaramella et al.

(10) Patent No.: US 9,755,759 B2
(45) Date of Patent: Sep. 5, 2017

(54) POLARISATION-INDEPENDENT COHERENT OPTICAL RECEIVER

(71) Applicant: Telefonaktiebolaget LM Ericsson (publ), Stockholm (SE)

(72) Inventors: Ernesto Ciaramella, Pisa (IT); Marco Presi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/039,890

(22) PCT Filed: Nov. 27, 2014

(86) PCT No.: PCT/IB2014/066387
§ 371 (c)(1),
(2) Date: May 27, 2016

(87) PCT Pub. No.: WO2015/079400
PCT Pub. Date: Jun. 4, 2015

(65) Prior Publication Data
US 2017/0026134 A1 Jan. 26, 2017

(30) Foreign Application Priority Data

Nov. 29, 2013 (IT) ............................... TO2013A0973

(51) Int. Cl.
*H04B 10/61* (2013.01)
(52) U.S. Cl.
CPC ......... *H04B 10/614* (2013.01); *H04B 10/611* (2013.01); *H04B 10/6166* (2013.01)
(58) Field of Classification Search
CPC ..... H04B 10/615; H04B 10/63; H04B 10/616
(Continued)

(56) References Cited

U.S. PATENT DOCUMENTS 4,732,447 A    3/1988   Wright et al.
5,127,066 A    6/1992   Poggiolini
(Continued)

FOREIGN PATENT DOCUMENTS

DE      3821438 A1    12/1989

OTHER PUBLICATIONS

L.G. Kazovsky et al., "Ask Multiport Optical Homodyne Receivers", Journal of Lightwave Technology, vol. LT-5, No. 6, pp. 770-791, Jun. 1987.

(Continued)

*Primary Examiner* — Don N Vo
(74) *Attorney, Agent, or Firm* — Howson & Howson LLP

(57) ABSTRACT

In a coherent optical receiver, a received signal and an oscillator-generated signal, having frequency difference such that the receiver operates under intradyne conditions, are made to beat in a 3×3 optical coupler. A polarizing beam-splitter splits one of the signals into components with orthogonal polarization which are applied to inputs of the coupler, which receives the other of the received or oscillator-generated signal. After photoelectric conversion, the signals are fed to analog processing devices generating an electrical signal representing the received signal that is fed to a low pass filter before being demodulated. The frequency difference between the signals and the passband of the filter are such that a component of the electrical signal, oscillating at a frequency depending on the frequency difference and having amplitude and phase depending on the instant state of polarization of the received signal, is suppressed. A method is also provided.

12 Claims, 2 Drawing Sheets

(58) Field of Classification Search
USPC .......................................................... 398/202
See application file for complete search history.

(56) References Cited

U.S. PATENT DOCUMENTS

| | | |
|---|---|---|
| 7,307,722 B2 | 12/2007 | Martinelli et al. |
| 7,555,227 B2 | 6/2009 | Bontu et al. |
| 8,670,679 B2 * | 3/2014 | Chung ................. H04B 10/614 |
| | | 398/202 |
| 2008/0038001 A1 * | 2/2008 | Becker ................. H04B 10/616 |
| | | 398/204 |
| 2014/0186024 A1 * | 7/2014 | Randel ................. H04B 10/616 |
| | | 398/25 |

OTHER PUBLICATIONS

J. Siuzgak, "BER Evaluation for Phase and Polarization Diversity Optical Homodyne Receivers using Noncoherent ASK and DPSK Demodulation", Journal of Lightwave Technology, vol. 7, No. 4, (Abstract Only), Apr. 2007.

* cited by examiner

POLARISATION-INDEPENDENT COHERENT OPTICAL RECEIVER

TECHNICAL FIELD

This invention relates to optical-fibre communication systems, and more particularly it concerns a coherent optical receiver which is independent of the state of polarisation of the received signal.

BACKGROUND OF THE INVENTION

Coherent techniques, thanks to their high wavelength selectivity and high sensitivity, are considered to be the most promising solution for detecting also ultra-dense wavelength division multiplexed optical signals, use of which is proposed for next generation access and distribution optical networks. In such an application, coherent receivers will have to be made available to the users, and therefore it is essential that they have a limited cost, typical of the products of consumer electronics. Yet, the currently existing coherent receivers, which have been studied for the transport network, employ sophisticated and hence expensive optical and electronic components, which are therefore incompatible with the requirements of a wide diffusion. Other applications that will take advantage of cheap coherent receivers will be the optical front haul/backhaul of cellular networks (i.e. the optical connections of base stations of cellular networks, e.g. according the so-called long term evolution, LTE, or the Common Public Radio Interface, CPRI), the metropolitan networks or the data centres, where a high number of terminals are envisaged.

Coherent receivers that can employ optical components of common use, such as distributed feedback (DFB) lasers, and an analogue signal processing, and hence can be manufactured at low cost, are already known.

An example is disclosed in the paper "ASK Multiport Optical Homodyne Receivers", by L. G. Kazovsky et al., Journal of Lightwave Technology, Vol. LT-5, No. 6, pages 770-790, June 1989, on which the preamble of claim 1 is based. In this known receiver, the beat between the received signal, which is an amplitude-modulated signal, and the signal from the local oscillator is carried out by means of a multiport optical coupler, e.g. a coupler with three inputs and three outputs, which receives the two signals of which the beat is to be created (i.e., the received signal and the signal from the local oscillator) at two inputs, whereas the third input is not utilised. Thus, three signals, which are each proportional to the optical beat between the received signal and the signal from the local oscillator and are phase shifted by a phase shift which is different for each of the three outputs (0, +120°, −120°, in the ideal case), are present on the coupler outputs. The three signals are independently detected by respective photodetectors, which provide three analogue signals. Such detected signals are then low-pass filtered, squared and combined into a single signal by means of an adder. The single signal is then subjected to a further low-pass filtering.

A second example is disclosed in U.S. Pat. No. 4,732,447, which discloses the application of the receiver also to phase-modulated signal.

Experiments carried out by the Applicant have demonstrated that a receiver of this kind is capable of operating also in ultra-dense wavelength division multiplexing passive optical networks.

In both cases discussed above, the coherent receiver can correctly operate only if the states of polarisation of both the received signal and the signal from the local oscillator coincide. However, the state of polarisation of the signal from the local oscillator is fixed, whereas that of the received signal changes in random manner, since the monomode optical fibres used as transmission lines have birefringence characteristics variable with distance and time. In general, therefore, only a fraction of the field undergoes conversion and a fading, even total, of the signal can occur.

Yet, the prior art receivers discussed above are polarisation sensitive, and hence it is necessary to adopt in them one of the techniques currently employed or proposed for obtaining the independence from the state of polarisation of the received signal in coherent systems. All such solutions entail a considerable increase in the complexity and hence in the cost, thereby making the receivers incompatible with the requirements of large scale diffusion.

In particular, polarisation diversity (see e.g. U.S. Pat. No. 7,555,227) requires duplicating the detection chain for the two orthogonal states of polarisation. This technique is currently used in transport networks using polarisation division multiplexing, in which case the increase in the complexity and hence in the cost is compensated by the increase in the capacity afforded by polarisation division multiplexing. Yet, in the case of the access networks where such a multiplexing is not envisaged, duplicating the receiver structure only results in doubling the manufacturing costs and the energy consumption.

Among the other known techniques, polarisation modulation at the transmitting side (see U.S. Pat. No. 5,127,066) and automatic polarisation alignment (see U.S. Pat. No. 7,307,722) entail using additional components (e.g. polarisation modulators), which are expensive per se and moreover cause degradation of the performance.

Siuzdak J. et al., "BER Evaluation for Phase and Polarization Diversity Optical Homodyne Receivers Using Non-coherent ASK and DPSK Demodulation", Journal of Lightwave Technology, Vol. 7, No. 4, April 1989, pages 584-599, discloses two other alternative strategies: a phase diversity homodyne receiver equipped with a polarisation control for making the states of polarisation of the received signal and the signal from the local oscillator coincide, and a polarisation and phase diversity homodyne receiver with polarising beam splitters on the paths of both the received signal and the signal from the local oscillator.

DE 38 21 438 A1 discloses a polarisation-independent heterodyne receiver, where the received signal and the signal from the local oscillator are combined by means of a network of 2×2 couplers and detected by three photodiodes. Yet, this scheme does not provide for phase diversity and this entails that the receiver has necessarily to be employed in heterodyne mode. This has considerable drawbacks: first, heterodyne detection requires use of components with wider bands and reduces receiver sensitivity; moreover, it cannot be used in case of modulation formats according to which the signal is in-phase and quadrature (I/Q) modulated; lastly it requires a very precise control of the frequency difference between the signal from the local oscillator and the received signal. Moreover, the analogue processing of the electrical signals resulting from the photoelectric conversion is rather complex. Furthermore, use of a heterodyne receiver limits the possibility of use in a wavelength division multiplexing (WDM) system with high channel density.

DESCRIPTION OF THE INVENTION

It is an object of the invention to provide a coherent receiver which ensures a polarisation-independent operation and which can be manufactured in simple and cheap manner, without requiring a precise control of the frequency of the signal generated by the local oscillator.

According to the invention, this is obtained in that: the receiver further comprises optical signal splitting means located on the path of one out of the received signal and the signal generated by the local oscillator and arranged to split the signal applied thereto into two components with orthogonal polarisation and to send such components to two inputs of a single 3×3 coupler, which receives at a third input the other out of the signal generated by the local oscillator and the received signal; the analogue processing devices are arranged to generate a resultant electrical signal, representing the received signal and comprising a baseband component and a replica thereof that is frequency shifted by an amount depending on the frequency difference between the received signal and the signal generated by the local oscillator and has an amplitude depending on the instant states of polarisation of the received signal and the signal generated by the local oscillator; said frequency difference is such that the receiver operates under intradyne conditions; and the passband of a low pass filter receiving such an electric signal and the value of said frequency difference are such that the filter substantially suppresses said replica.

The invention also provides a method for coherent reception of modulated optical signals, wherein: one out of the received signal and the signal generated by the local oscillator is split into two components with orthogonal polarisation and such components and the other out of the received signal and the signal generated by the local oscillator are applied to devices creating the beat, the analogue processing generating a resultant electrical signal comprising a baseband component and a replica thereof that is frequency shifted relative to said baseband component by an amount depending on the frequency difference between the received signal and the signal generated by the local oscillator and has an amplitude depending on the states of polarisation of the received signal and the signal generated by the local oscillator; said frequency difference is such that the receiver operates under intradyne conditions; and a passband of a low pass filtering to which said resultant electrical signal is subjected and said frequency difference are such that said replica falls substantially outside said passband.

BRIEF DESCRIPTION OF THE FIGURES

The above and other features and advantages of the present invention will become apparent from the following description of preferred embodiments made by way of non limiting example with reference to the accompanying drawings, in which.

DESCRIPTION OF PREFERRED EMBODIMENTS

Figure 1:
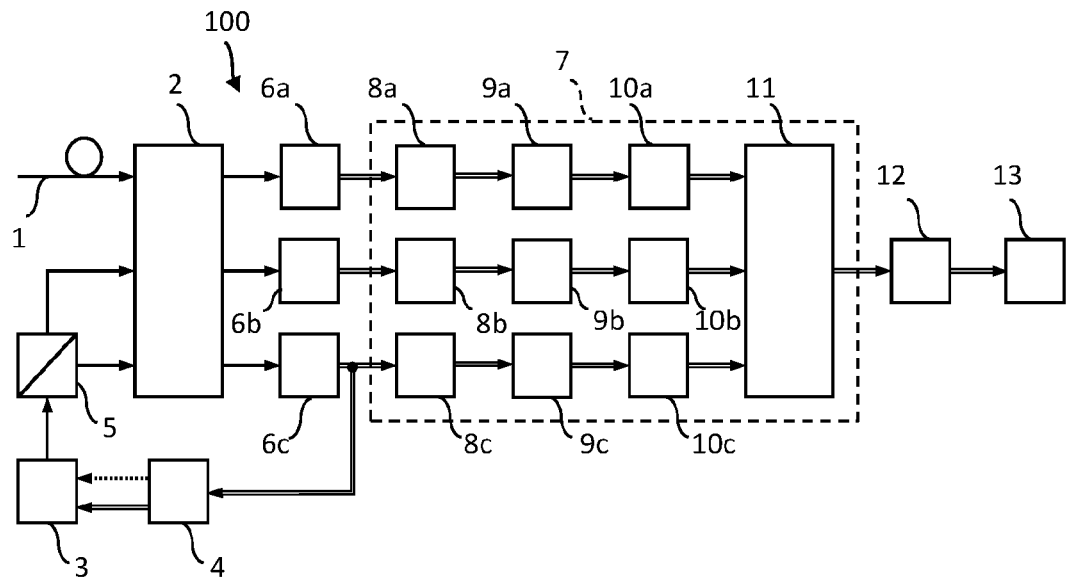
FIG. 1 is a block diagram of a first embodiment of the invention.

In the drawings, single line arrows represent optical connections, and double line arrows represent electrical connections.

Referring to FIG. 1, in receiver 100 an optical information signal (received signal), coming from a remote transmitter (not shown) over an optical-fibre transmission line 1, is applied to the first input of an optical fibre coupler 2 having at least three inputs and three outputs (in the drawings, a coupler with three inputs and three outputs or 3×3 coupler), such that energy is coupled from each input to all outputs. In this example, the signal is an amplitude-modulated signal, for instance according to an on-off keying (OOK). Line 1 is a conventional monomode fibre (i.e. a fibre that does not maintain polarisation), so that the received signal has a state of polarisation varying with distance and time.

A local oscillator 3, e.g. a distributed feedback laser, generates a signal (local signal) polarised for instance at 45° and having a frequency differing from the central frequency of the received signal by an amount $\Delta v$. Value $\Delta v$ is such that the receiver operates under intradyne conditions, i.e. such that the frequency of the local oscillator falls within the band of the received signal. As it will be discussed in more detail below, such a difference $\Delta v$ is an essential parameter for obtaining polarisation independence. Oscillator 3 has associated therewith devices 4 for temperature control (dotted line arrow) and current control for stabilising the emission frequency, said devices being wholly conventional.

The local signal is fed to a polarising beam splitter 5, which splits it into its orthogonal polarisation components, having the same amplitude in the considered example, which are applied to a second and a third input, respectively, of coupler 2. Contrary to the prior art, all three inputs of the coupler are therefore utilised. The connections between splitter 5 and coupler 2 are implemented so that they do not alter the state of polarisation of the respective component of the local signal.

Coupler 3 outputs three signals mutually phase shifted by 120°, which are sent to respective photodetectors 6a, 6b, 6c, for instance PIN photodetectors integrated with transimpedance amplifiers, the output currents $i_k$ (k=a, b, c) of which are subjected in identical manner to an analogue processing in a processing block 7. Optionally, the output of one of the three photodetectors, for instance photodetector 6c, can be fed also to devices 4 performing the current control of oscillator 3.

The processing performed in block 7 substantially corresponds to the processing disclosed in the paper by L. G. Kazovsky et al. mentioned above. The output current of each photodetector 6a-6c passes in a DC blocking component 8a-8c and then in a low pass filter 9a-9c, having a bandwidth B1 corresponding to the passband of photodetectors 6, which clearly will depend on the bit rate of the received signal. The filtered signals are squared in respective components 10a-10c and summed up in an adder 11. The adder is followed by a low pass filter 12 having a bandwidth B2, which in turn is followed by a conventional circuit 13 for data and synchronism recovery. Bandwidth B2 too will depend on the bit rate of the received signal. Such a bandwidth is a trade-off between the requirements of introducing no intersymbol interference (what requires that the band is not too narrow) and limiting the noise (what requires that the band is not too broad). In particular, bandwidth B2 may be in the range from 65% to 100% of the bit rate, for instance it can be 75% of the bit rate. The choice of B2 determines the choice of $\Delta v$, as it will be discussed below.

Adder 11 and filter 12 can be made as a single component.

Figure 2:
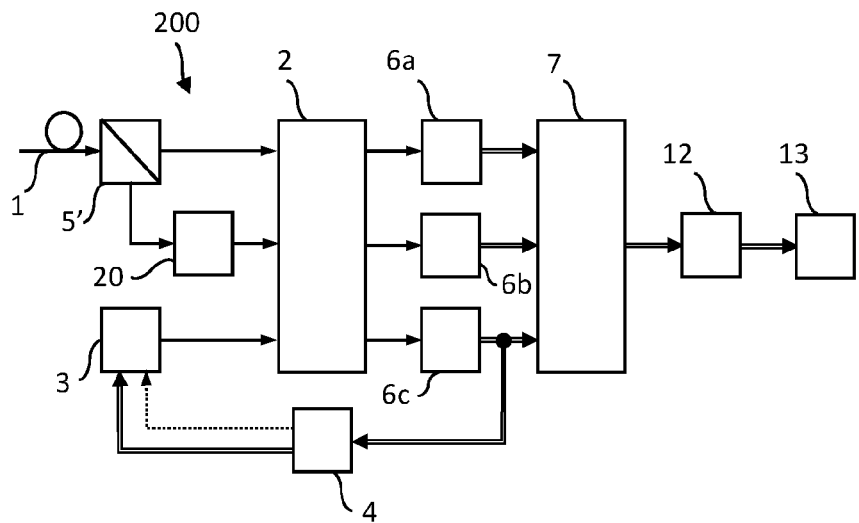
FIG. 2 is a block diagram of a second embodiment of the invention.

In receiver 200 shown in FIG. 2, where elements identical to those shown in FIG. 1 are denoted by the same reference numerals, the polarising beam splitter, denoted 5', is located on the path of the information signal coming from line 1, and it splits such a signal into its orthogonal polarisation components. One of these components, e.g. the vertical component, is directly fed to a first input of coupler 2, whereas the other component is fed to a second input of coupler 2 after having passed through a polarisation rotator 20, which rotates its polarisation by 90°. In this manner, both components of the received signal arrive at the coupler with the same polarisation. The paths of both components of the received signal are such that said components arrive at the coupler without any appreciable relative delay. The third input of coupler 2 is connected to local oscillator 3 which, in this variant embodiment, generates a signal having the same polarisation as the signal outgoing from rotator 20. The other parts of the receiver are identical to those described with reference to FIG. 1.

Simulations carried out by the Applicant have demonstrated that the performances of both embodiments are very similar.

The mathematical analysis of the described circuit shows that signal S(t) at the output of processing block 7 comprises a baseband component (representing the correct signal) and a spurious replica centred at 2Δν, having phase and amplitude depending on the instant state of polarisation of the received signal. For instance, in the case of the diagram shown in FIG. 1, with a local signal polarised at 45°, signal S(t is expressed by relation:

$$S(t) = \frac{2}{3}R^2 E_{LO}^2 r(t)^2 \left[ 1 - \sin(2\varphi)\sin\left(\frac{\pi}{6} - 4\pi\,\Delta v\,t - \psi\right) \right]$$

where:
 R is the photodetector responsivity;
 $E_{LO}$ is the amplitude of both components of the local signal;
 r(t) is the amplitude of the received signal;
 φ is the orientation of the main axis of the polarisation ellipse of the received signal; and
 ψ is the ellipticity angle of the state of polarisation of the received signal (ψ=0 in case of linear polarisation).

The second term within the square brackets represents the spurious component with random amplitude depending on the states of polarisation of the received signal and the signal generated by the local oscillator. Such a component becomes zero in the particular case of φ=nπ/4 (n=0, 1, 2 ... ), i.e. in case of a signal with horizontal or vertical polarisation (i.e. parallel to one of the two components of the signal from the local oscillator), but generally it is not negligible. In case of perfect homodyne reception (Δν=0), as in the prior art by Kazovsky et al. mentioned above, the spurious component has a complete spectral overlap with the received signal, thereby generating an interference that unacceptably distorts such a signal. If on the contrary the receiver is made to operate under intradyne conditions (i.e. with a not negligible value of Δν), the spurious component oscillates at a frequency 2Δν. Taking into account that signal S(t) is low-pass filtered in filter 12, then the value of Δν can be chosen so that, given a certain band B2 of filter 12, the spurious component falls outside said band and is therefore suppressed or, at least, has a minimum spectral overlap with the received signal.

Figure 3:
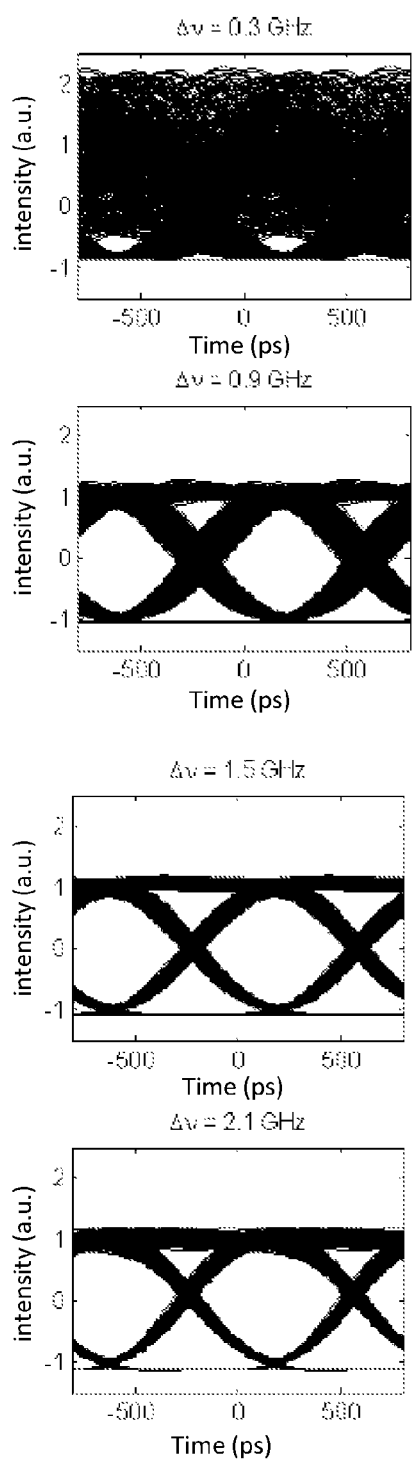
FIG. 3 shows eye diagrams of the demodulated signal obtained through simulations carried out for different values of the frequency difference between the received signal and the signal from the local oscillator.
Figure 4:
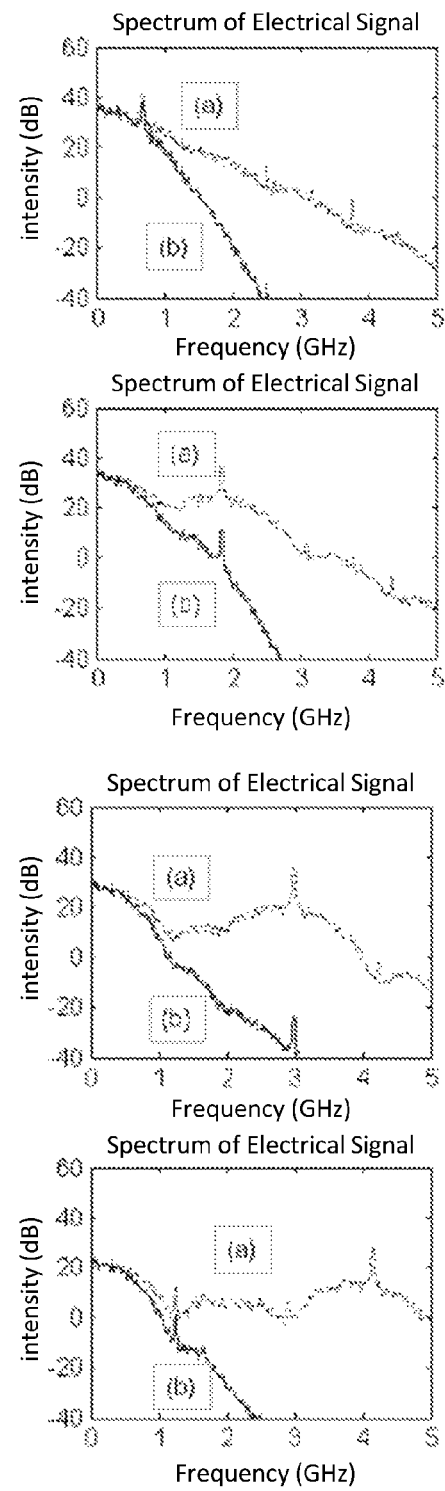
FIG. 4 shows the corresponding electrical spectra before and after low pass filtering.

FIGS. 3 and 4 show the results of simulations of the receiver shown in FIG. 1, carried out by assuming a transmission at 1.25 Gbit/s, with the received signal having a slowly variable state of polarisation, and by modelling photodetectors 6a-6c with a 4th-order Bessel filter having a bandwidth B1 of 2 GHz, and filter 12 with a 4th-order Bessel filter having a bandwidth B2 of 0.93 GHz. FIG. 3 shows eye diagrams for the filtered signal for values Δν of 0.3 GHz, 0.9 GHz, 1.5 GHz and 2.1 GHz, and FIG. 4 shows the corresponding electrical spectra before (curves a) and after (curves b) the low pass filtering. FIG. 3 shows that, as Δν increases, one passes from a condition of almost completely closed eye (Δν=0.3 GHz) to a condition of clearly open eye. FIG. 4 in turn shows the good suppression of the spurious component existing in the signal before filtering. The simulations thus demonstrate the attainment of the desired independence from the state of polarisation of the received signal.

The invention actually attains the desired aims. Indeed, with respect to the low cost receiver of the prior art by Kazovsky et al, the independence from the state of polarisation of the received signal is achieved by using the third input of coupler 2 and by adding only a polarising beam splitter, which is a cheap component. The remaining part of the receiver, including the analogue processing devices, does not undergo modifications. It is therefore clear that the invention is suitable for manufacturing low cost terminals, as required for the applications mentioned above.

It is to be appreciated that the optical components in both schemes illustrated in FIGS. 1 and 2 (coupler 2, beam splitters 5, 5', polarisation rotator 20) can be manufactured in simple manner as discrete components. However, the same components can be manufactured by using photonic integrated circuit (PIC) technology, by means of solutions based on both hybrid and monolithic integration. The possibility of manufacturing such components by using the PIC technology has already been demonstrated. From this point of view, it is also to be pointed out that generally the waveguides of the photonic integrated circuits better operate if the signal has a single state of polarisation. Thus the scheme depicted in FIG. 2, which splits the received signal into X and Y polarisations and rotates one of these polarisations so that all three signals incoming to the 3×3 coupler have the same (linear) polarisation, is no doubt the scheme that is better suitable for being implemented by using the PIC technology at present available.

It is clear that changes and modifications are possible without departing from the scope of the invention as defined in the appended claims.

For instance, in the embodiment shown in FIG. 1, taking into account that the local signal is polarised, polarising beam splitter 5 can be replaced by a conventional beam splitter arranged to equally split the local signal among the two outputs thereof, and by a pair of controllers of the state of polarisation (in particular, polarisation rotators), one on each output, which suitably rotate the polarisation.

Moreover, in the embodiment shown in FIG. 2, in the case of implementation by means of discrete components, polarisation rotator 20 could be implemented by simply rotating the polarisation-maintaining fibre of polarising beam splitter 5' by 90° at the point of connection with coupler 2.

If more noise is accepted, bandwidth B2 of filter 12 can even exceed 100% of the bit rate (for instance, for constructional reasons, because the signal is a return to zero signal, and so on). In this case, in order the spurious replica is substantially filtered off by filter 12, Δν must have a greater value with respect to the exemplified case in which B2 is 75% of the bit rate. In a simple approximation, Δν>B2. It is to be appreciated that, if B2 exceeds 100% of the bit rate, the receiver operates under heterodyne conditions.

Furthermore, even if block 7, as shown in FIG. 1, performs an analogue processing substantially corresponding to that disclosed in the paper by Kazovsky et al., different implementations of such a block are possible. For instance, by using differential photodetectors $6k$ (k=a, b, c), i.e. detectors providing both current $+i_k$ and current $-i_k$, the squares of the differences $(i_a-i_b)^2$, $(i_c-i_a)^2$, $(i_c-i_b)^2$ between the output currents can be summed up in place of the squares $i^2_k$ of the currents. In the alternative, the squares of the in-phase and quadrature components I, Q of the signal (e.g. I=$i_a$, Q=$2(i_b+i_c)-i_a$) can be summed up. If the coupler is ideal, i.e. it produces phase shiftings of 0° and ±120° between the output signals, the three solutions are equivalent, apart from a multiplicative factor.

Lastly, the receiver can be employed for signals with a modulation different from amplitude modulation, with a suitable choice of Δv and suitable modifications in the processing. In particular, the receiver described above is of course also suitable for the reception of a duo-binary signal, without further modifications of the electrical processing and of the optical part. On the other side, the receiver could even be employed with differential phase shift keying (DPSK) signals, but in this case Δv must be 50% or 100% of the bit rate, with very narrow tolerances. The electrical processing is slightly different and it can be deduced from that disclosed in U.S. Pat. No. 4,732,447.

Besides being used in optical communication systems, the polarisation-independent receiver according to the invention can be used also within a high resolution optical spectrum analyser. As known, such devices generally use a coherent receiver (a homodyne receiver or, more frequently a heterodyne receiver), which is not employed for detecting a transmitted digital sequence, but for obtaining the value of the average power within a given frequency range. The present spectrum analysers based on coherent detection suffer from the problems of sensitivity to the state of polarisation of the received signal discussed above. Thus, use of a receiver that is intrinsically polarisation-independent considerably simplifies the analyser, by dispensing also in this case with the need to duplicate the processing chain or to provide additional devices. In such an application, block 13 will include, in conventional manner, an electrical filter which will be chosen depending on the desired resolution (approximately, the optical resolution is twice the electrical bandwidth of the output filter) in order to select the band of interest, as well as the means for computing the signal power and displaying the spectrum.

The invention claimed is:

1. A polarisation-independent coherent optical receiver, comprising:
an optical coupler (2) having three inputs and three outputs, which receives a modulated optical signal and an optical signal generated by a local oscillator (3) and creates the beat between such signals;
an optical signal splitter (5; 5'), which is located on the path of one out of the modulated optical signal and the signal generated by the local oscillator, splits the signal applied thereto into two components having orthogonal polarisations and sends such components to two inputs of the coupler (2), which receives at a third input the other out of the modulated optical signal and the signal generated by the local oscillator (3);
three photodetectors (6a, 6b, 6c) respectively connected to the coupler outputs and converting the optical signals outgoing from the coupler (2) into electrical signals;
analogue processing circuitry (7, 8a, 8b, 8c, 9a, 9b, 9c, 10a, 10b, 10c, 11) receiving and processing the electrical signals outgoing from the photodetectors (6a, 6b, 6c) and generating a resultant electrical signal that represents the modulated optical signal and includes a baseband component; and
a low-pass filter (12) filtering the resultant electrical signal;
characterised in that:
the optical coupler (2) is of a kind providing at the three outputs thereof optical signals having the same mutual phase shift;
the analogue processing circuitry (7-11) includes at least:
three squaring circuits (10a, 10b, 10c) squaring said electrical signals or combinations thereof; and
an adder (11) summing up the signals outgoing from the squaring circuits (10a, 10b, 10c) and outputting said resultant electrical signal;
wherein the resultant electrical signal includes, besides the baseband component, a spurious component that is centred on a frequency depending on a frequency difference between the modulated optical signal and the signal generated by the local oscillator (3) and that has an amplitude and a phase depending on the instant states of polarisation of the modulated optical signal and the signal generated by the local oscillator;
said frequency difference is such that the receiver (100; 200) operates under intradyne conditions; and
a passband of said low pass filter (12) and said frequency difference are such that said spurious component falls outside said passband or has a minimum spectral overlap with the modulated optical signal.

2. The receiver as claimed in claim 1, wherein the low pass filter (12) has a passband in a range from about 65% to about 100% of a bit rate of the modulated optical signal, preferably a passband of the order of 75% of said bit rate.

3. The receiver as claimed in claim 1, wherein:
the local oscillator (3) is of a kind generating a polarised signal comprising two orthogonally polarised components having the same amplitude; and
the optical signal splitter (5) is located on the path of the signal generated by the local oscillator (3) and comprises either a polarising beam splitter, or a non-polarising beam splitter of a kind equally splitting the signal between its outputs and having controllers of the state of polarisation on each output.

4. The receiver as claimed in claim 3, wherein said optical coupler (2), said optical signal splitter (5, 5') and said controllers of the state of polarisation said polarisation rotator (20) are implemented by means of a photonic integrated circuit technology.

5. The receiver as claimed in claim 1, wherein:
the optical signal splitter (5') is located on the path of the modulated optical signal;
an output of the optical signal splitter (5') is associated with a polarisation rotator (20) such that both components of the modulated optical signal arrive at the coupler (2) with the same polarisation; and
the local oscillator (3) is configured so as to generate a signal having the same polarisation as the component outgoing from the rotator (20).

6. The receiver as claimed in claim 5, wherein said optical coupler (2), said optical signal splitter (5, 5') and said polarisation rotator (20) are implemented by means of a photonic integrated circuit technology.

7. The receiver as claimed in claim 1, wherein said low pass filter (12) is connected to means (13) for recovering a synchronism signal and information data from the filtered signal and/or for determining the average power of the modulated signal in a given frequency range.

8. The receiver as claimed in claim 1, wherein said coupler (2) is a coupler in which the energy is coupled from each input to all outputs.

9. A method for polarisation-independent coherent reception of modulated optical signals, wherein:
- the beat between a received modulated optical signal and an optical signal generated by a local oscillator (3) is created after having split one out of the modulated optical signal and the signal generated by the local oscillator into two components with orthogonal polarisations, the beat generating three optical signals;
- said three optical signals are converted into respective electrical signals;
- said electrical signals are subjected to an analogue processing such as to generate a resultant electrical signal representing the modulated optical signal and including a baseband component; and
- the resultant electrical signal is subjected to low-pass filtering;

characterised in that:
- said beat generates three optical signals having the same mutual phase shift;
- the analogue processing includes squaring the signals resulting from the photoelectric conversion, or a combination thereof, and combining the signals resulting from the squaring into said resultant electrical signal, which comprises, besides the baseband component, a spurious component that is centred on a frequency depending on a frequency difference between the modulated optical signal and the signal generated by the local oscillator (3) and that has an amplitude and a phase depending on the instant states of polarisation of the modulated optical signal and the signal generated by the local oscillator (3);
- said frequency difference is such that reception takes place under intradyne conditions; and
- a passband of the low pass filtering and said frequency difference are such that said spurious component falls outside said passband or has a minimum spectral overlap with the modulated optical signal.

10. The method as claimed in claim 9, wherein said passband is in a range from about 65% to about 100% of a bit rate of the modulated optical signal, and preferably is of the order of 75% of said bit rate.

11. The method as claimed in claim 9, wherein:
- the signal generated by the local oscillator (3) is a signal comprising two components with orthogonal polarisations having the same amplitude; and
- said signal generated by the local oscillator (3) is split into said components with orthogonal polarisations.

12. The method as claimed in claim 9, wherein:
- the modulated optical signal is split into said components with orthogonal polarisations;
- the polarisation of one of the components resulting from the splitting is rotated so that devices (2) creating the beat receive signals having the same polarisation; and
- a signal having the same polarisation as that obtained through said rotation is generated by means of the local oscillator (3).

* * * * *